United States Patent
Russell et al.

(10) Patent No.: US 10,694,429 B2
(45) Date of Patent: Jun. 23, 2020

(54) SYSTEM AND METHOD FOR MANAGING DATA CONNECTIVITY LINKS FOR AVIATION VEHICLES

(71) Applicant: AERONET GLOBAL COMMUNICATIONS LABS DAC, Dublin (IE)

(72) Inventors: Brian Russell, Dublin (IE); Ronan Farrell, Dublin (IE)

(73) Assignee: AERONET GLOBAL COMMUNICATIONS LABS DAC, Dublin (IE)

(*) Notice: Subject to any disclaimer, the term of this patent is extended or adjusted under 35 U.S.C. 154(b) by 0 days.

(21) Appl. No.: 16/077,465

(22) PCT Filed: Feb. 13, 2017

(86) PCT No.: PCT/EP2017/053174
§ 371 (c)(1),
(2) Date: Aug. 11, 2018

(87) PCT Pub. No.: WO2017/137632
PCT Pub. Date: Aug. 17, 2017

(65) Prior Publication Data
US 2019/0053106 A1  Feb. 14, 2019

Related U.S. Application Data

(60) Provisional application No. 62/294,569, filed on Feb. 12, 2016.

(30) Foreign Application Priority Data

Feb. 19, 2016 (EP) .................................. 16156609

(51) Int. Cl.
H04W 40/26 (2009.01)
H04W 36/00 (2009.01)
(Continued)

(52) U.S. Cl.
CPC .... *H04W 36/0027* (2013.01); *H04B 7/18504* (2013.01); *H04B 7/18506* (2013.01); *H04W 36/08* (2013.01)

(58) Field of Classification Search
USPC ............................................. 455/431, 432.1
See application file for complete search history.

(56) References Cited

U.S. PATENT DOCUMENTS

2004/0253949 A1  12/2004  Swensen et al.
2010/0142445 A1*  6/2010  Schlicht .................. H04W 4/20
                                                        370/328
(Continued)

FOREIGN PATENT DOCUMENTS

EP    2139286 A1    12/2009

OTHER PUBLICATIONS

PCT/EP2017/053174. International Search Report & Written Opinion (dated Jul. 10, 2017).

*Primary Examiner* — Tu X Nguyen
(74) *Attorney, Agent, or Firm* — Loza & Loza, LLP; Anthony G. Smyth

(57) ABSTRACT

The invention provides a method and system for managing data connectivity links for a plurality of aircraft in a network wherein at least one aircraft is a non-cooperative aircraft, said network comprising a plurality of sub-mesh regions, each sub-mesh having a plurality of nodes, wherein at least one node is representative of an aircraft, and a control sub-mesh node configured to maintain a plurality of data links with the plurality of aircraft in the sub-mesh region based on a generated real-time map of data connections for the sub-mesh region; and a master control node configured to control each control sub-mesh node of each sub-mesh region.

19 Claims, 5 Drawing Sheets

(51) Int. Cl.
*H04B 7/185* (2006.01)
*H04W 36/08* (2009.01)

(56) References Cited

U.S. PATENT DOCUMENTS

2013/0177321 A1    7/2013   Devaul et al.
2015/0063202 A1    3/2015   Mazzarella et al.

* cited by examiner

SYSTEM AND METHOD FOR MANAGING DATA CONNECTIVITY LINKS FOR AVIATION VEHICLES

CROSS-REFERENCE TO RELATED APPLICATIONS

This application is the U.S. National Stage of International Patent Application No. PCT/EP2017/053174 filed on Feb. 13, 2017, which claims the benefit of priority from EP Patent Application No. 16156609.6 filed Feb. 19, 2016 and U.S. Provisional Patent Application No. 62/294,569 filed Feb. 12, 2016, the disclosures of the foregoing applications being incorporated herein by reference in their entirety for all applicable purposes.

FIELD

The invention relates to a system and method for managing data connectivity links for aviation vehicles or aircraft and the like.

BACKGROUND

Aviation aircraft operate in a dynamic environment requiring pro-active control to ensure that IP data connectivity to the flight can be achieved, maintained and that safety and security is not compromised by unwanted data interception.

This becomes challenging and problematic when the underlying network providing the IP data connectivity is also in a dynamic environment (i.e. other aviation aircraft) and control needs to be shared across interconnected aircraft and ground based controllers.

US2004/253949, assigned to Boeing, discloses a wireless communications system and method provides wireless communications service for user equipment on board an aircraft. The aircraft includes on-board system equipment for supporting the wireless communications service with on-board user equipment. One or more ground stations are used for communicating with the aircraft using a plurality of feeder links for exchanging the wireless communications service's traffic and control information with the on-board system equipment, and for providing interfaces with a terrestrial telecommunications infrastructure. A mobile switching center manages the ground stations and the on-board system equipment of the aircraft, wherein the mobile switching center includes at least one platform visitor location register (VLR) associated with each aircraft to ensure proper registration and tracking of the user equipment used on board the aircraft. The Boeing patent publication focusses on a visitor location register that can be associated with an aircraft for the purposes of providing data services via a ground-to-air communications link. However a problem with this approach is that it does not envisage aircraft-to-aircraft communications and the system does not dynamically maintain IP coverage.

US2013/177321, assigned to Google Inc., discloses an exemplary network system may include: (a) a plurality of super-node balloons, where each super-node balloon comprises a free-space optical communication system for data communications with one or more other super-node balloons and (b) a plurality of sub-node balloons, where each of the sub-node balloons comprises a radio-frequency communication system that is operable for data communications.; Further, at least one super-node balloon may further include an RF communication system that is operable to transmit data to at least one sub-node balloon, where the RF communication system of the at least one sub-node balloon is further operable to receive the data transmitted by the at least one super-node balloon and to transmit the received data to at least one ground-based station. Again a problem with this approach is that it does also envisage aircraft-to-aircraft communications and the system does not dynamically maintain IP coverage for moving aircraft. In addition the Google system does not address the situation where there is one or more non-cooperative independent aircraft which are owned by entities other than the telecommunication system operator require reliable data links.

It is therefore an object to provide an improved system and method for managing data connectivity links for aviation vehicles.

SUMMARY

According to the present invention there is provided, as set out in the appended claims, a system for managing data connectivity links for aircraft in a network said network comprising a plurality of sub-mesh regions, each sub-mesh having a plurality of nodes and a control sub-mesh node configured to maintain a plurality of data links with the plurality of nodes in the sub-mesh region; and a master control node configured to control each control sub-mesh node of each sub-mesh region.

In one embodiment there is provided system for managing data connectivity links for a plurality of aircraft in a network wherein at least one aircraft is a non-cooperative aircraft, said network comprising:
  a plurality of sub-mesh regions, each sub-mesh having a plurality of nodes, wherein at least one node is representative of an aircraft, and a control sub-mesh node configured to maintain a plurality of data links with the plurality of aircraft in the sub-mesh region based on a generated real-time map of data connections for the sub-mesh region; and
  a master control node configured to control each control sub-mesh node of each sub-mesh region.

The invention provides a system and method for predictive management of the expected locations of the "station-keeping" aircraft based on a number of metrics —based on a ground-based controller.

In one embodiment the master control node provides a dynamic data connectivity link to at least one of the plurality of nodes via the control node.

In one embodiment the master control node is configured to provide dynamic assignment of data links between different nodes of said sub-mesh region.

In one embodiment the control sub-mesh node is connected to an internet exchange fibre optic link, wherein the fibre optic link provides high capacity low latency data routes for user data requests to be transmitted and received to a plurality of nodes in said sub-mesh region.

In one embodiment each sub mesh is connected to a superior hierarchy node via a series of low latency data connections.

In one embodiment data transmitted and/or received by the master controller for each sub-mesh are contained within a separate command and control (CC) layer of a data link.

In one embodiment the command and control layer is sent on a secure channel and assigned a highest priority traffic classification.

In one embodiment there is provided a module to generate a real time map of the data connectivity routing between nodes within the system; and stored in a database module at regular time intervals.

In one embodiment the module is configured to analyse historical maps for both the network routing and user demand requests.

In one embodiment the module analyses each sub-mesh and adjacent nodes for behaviour patterns.

In one embodiment the master controller combines the information from the behaviour analysis module with other input data sources and calculates the optimal IP data connectivity routing between existing and new nodes to maximise data link quality. Maximising data link quality can include assessing the aggregated IP demand broken down into telecoms traffic classifications. These classification categorize the demand sub-totals against the time bound requirement to meet the demand, e.g. real time video streaming gets expedited forwards while email get best efforts forwarding. The advantage is that when limited bandwidth is available the traffic can be prioritised based on the speed of transmission required for the service request (traffic class). In some embodiments cases when the controller cannot avoid bandwidth limitation impacting the connectivity service, then throttling is employed.

In one embodiment the other input data sources comprises at least one of the following: aircraft flight data from the on-board controller, flight paths, weather, policies ground-to air installed data capacity, ground to air angular coverage characteristics, air installed data capacity, current locations and future predictions.

In one embodiment the control sub-mesh node comprises a GEP controller.

In one embodiment each node in the plurality of nodes of a sub-mesh region comprises a moving aircraft.

In another embodiment there is provided a method for managing data connectivity links for aircraft in a network said network comprising a plurality of sub-mesh regions, each sub-mesh having a plurality of nodes and a control sub-mesh node, said method comprising the steps of:
 maintaining a plurality of data links with the plurality of nodes in the sub-mesh region; and
 controlling each control sub-mesh node of each sub-mesh region using a master control node.

In a further embodiment there is provided a method for managing data connectivity links for a plurality of aircraft in a network wherein at least one aircraft is a non-cooperative aircraft, said network comprising:
 maintaining a plurality of sub-mesh regions, each sub-mesh having a plurality of nodes, wherein at least one node is representative of an aircraft, and a control sub-mesh node configured to maintain a plurality of data links with the plurality of aircraft in the sub-mesh region based on a generated real-time map of data connections for the sub-mesh region; and
 controlling a master control node configured to control each control sub-mesh node of each sub-mesh region.

In one embodiment there is provided a module for collecting performance data from a real time dynamic network made up of aviation flights and strategic ground locations nodes.

In one embodiment there is provided a module for designing and maintaining IP data connectivity links across a dynamic network of aviation and ground station nodes.

In one embodiment there is provided a module for ensuring that only validated commands can be used to control data link establishment between aircraft and with the ground.

In one embodiment there is provided a system and method for the pro-active control of dynamic IP data connectivity network to aircraft by one or more persons, ensuring compliance with regulatory conditions.

In one embodiment there is provided a hierarchical scheme for granting network nodes appropriate levels of authorities based upon predefined roles and location; transferring data between the aerial vehicle, controllers, and a central operations centre; for operational constraints and configurations to be distributed to network nodes from the operations centre; ensuring that user-requested command requests are compliant with the system and local environment operational constraints.

In one embodiment a control sub mesh GEP controller is configured to assure the security of aircraft node connections to the network by centrally directing aircraft how to handover communications data links between nodes. To setup a data link the GEP controller tells the transmit antenna to expect the receiver antenna to come into range for establishing a link. It also tells the receive antenna the reverse. Both antenna then repeat the command back to the GEP to ensure it is received. Once confirmed the GEP controller tells the antenna breaking its datalink to prepare to stop transmitting. The GEP controller then provides a synchronised countdown to each antenna separately when to setup/break the datalink. In this way only known and trusted antenna can form datalinks to access the network and ensures the 1-1 relationship on ATG datalinks. This is all done over a command and control layer.

In one embodiment there is provided a dynamic assignment of data link between aircraft and ground nodes while maintaining safe and robust operation.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The invention provides a real time method for managing IP data routing between the nodes of the dynamic system of aircraft and controllers to maximise the number of connected aircraft and maximise the quality of user data connection experience.

In addition, a central master control or controller provides oversight on all commands to ensure that there is the appropriate level of authority and that it complies with all safety, mission, and other operational constraints. The central master control may be a single located facility or may delegate some functions to a distributed network of ground entry point controllers. The operations centre may be full automated, operated by humans, or a mixture of the two. In addition, the solution ensures against intentional or unintentional interference with the commands being sent to the distributed controller and aircraft—thus preventing hijacking, spoofing or other techniques used to interfere with the legitimate use of the IP data streams from these aircraft.

In order to access to the dynamic network all nodes/controllers must first be pre-registered. The original equipment installation and commissioning records and the annual maintenance records for the controllers shall be used as a source of valid data records. The serial numbers of each controller and relevant information for its associated ground station, aircraft node shall be centrally stored and available to a master controller.

Figure 1:
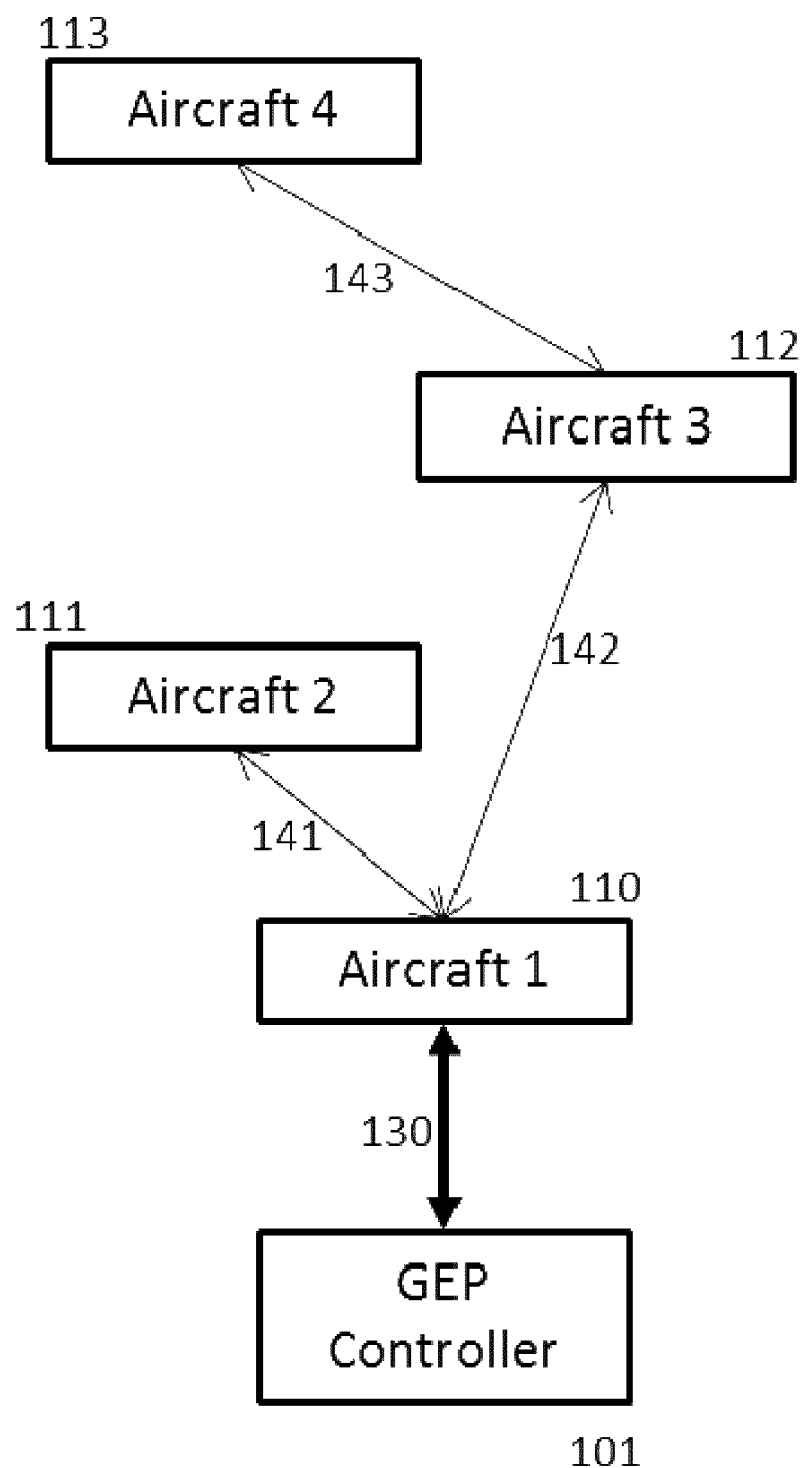
FIG. 1 illustrates an example of the overall architecture of how a time dependent sub-mesh of aircrafts connect to the ground controller. The entire network is made up of a number of sub-meshes with varying numbers of aircraft.

FIG. 1 illustrates an example of the overall architecture of how a time dependent sub-mesh of aircrafts connect to the ground controller. The entire network is made up of a number of these sub-meshes with varying numbers of aircraft. Based on the command directions received from with the system central control GEP controller (101) maintains and controls a series of secure radio links with a group of aircraft (110,111,112,113) to form the time dependent unique sub-mesh. The GEP controller uses one of its own antenna to form a secure radio link (130) with one of the antenna on aircraft 1. The GEP controller directs the on board antenna controller on aircraft 1 to form additional secure radio links (141,142) with aircraft 2 and 3. Once formed, the GEP controller similarly directs the on board antenna controller on aircraft 3 to form the additional secure radio link (143) with aircraft 4.

The GEP controller directs the maintenance of the secure links to the aircraft whereby those commands and any other relevant information may be sent to the aircrafts and telemetry, user data requests and other data returned.

The dynamic system is made up, in part, by a number of unique sub-meshes of nodes which have IP data connectivity to a single ground station. FIG. 1 provides an example of such a sub-mesh. In order to establish and maintain the IP data routing paths within the sub-mesh, each of the node controllers within the sub-mesh collect and share (both transmit and receive) key network and user demand information. Users can be either validated passengers or pre-approved operational flight systems. Examples of the type of information collected is shown below—

| Node | Network Info | User Demand Info |
| --- | --- | --- |
| Aircraft controller | Flight path data of location, altitude, bearing, speed, jaw Active radio links signal strength and quality Antenna pointing directions and angles | Aggregated user requests grouped by traffic classifications to identify required IP data class of service Number of active users User account details |
| Ground entry controller | Active radio links signal strength and quality Antenna pointing directions and angles Active radio links transmit power List of connected nodes | Traffic loading in each sub-mesh grouped by traffic classification |
| | Number and hierarchy of nodes connected within each sub-mesh | |

Figure 2:
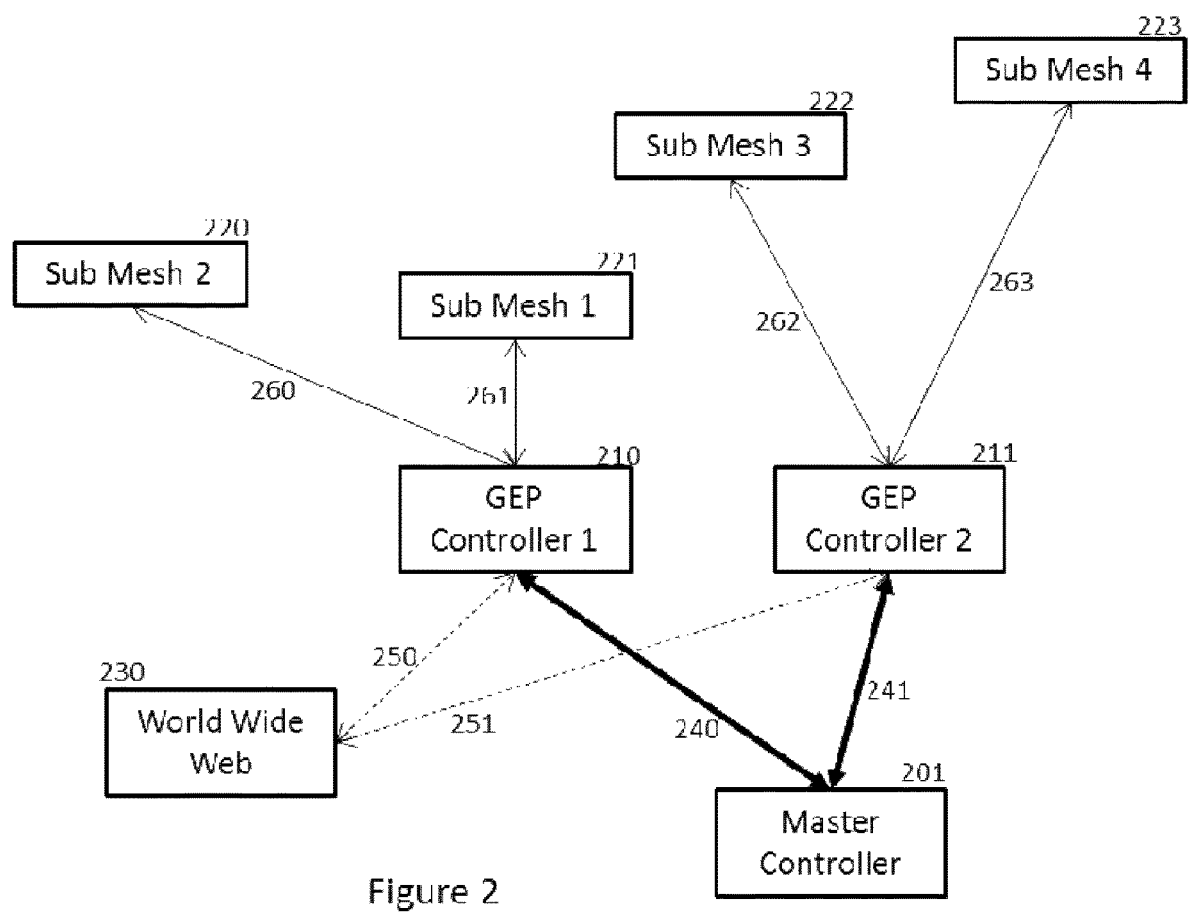
FIG. 2 illustrates a data link routing across the entire system, showing a master controller acting as the central and highest hierarchical node in the system.

FIG. 2 illustrates a data link routing across the entire system. The master controller (201) acts as the central and highest hierarchical node in the system. The master controller is permanently connected to the various GEP controllers (210, 211) via dedicated and security low latency high capacity fibre optic or radio links (240, 241). Only system command and control layer communications are sent via these links. Data link routing to the various and unique sub meshes (220, 221, 222, 223) is maintained as illustrated in FIG. 1.

Each GEP controller can be permanently connected to the wider internet via local or regional internet exchange fibre optic links (250, 251). These links offer high capacity low latency data routes for user data requests to be transmitted and received.

Each unique sub mesh is connected to a superior hierarchy nodes with the system via a series of low latency data connections, as illustrated in FIG. 2. The master controller's role is to control the system wide routing. The multiple internet exchange connections provide external routing paths to the world wide web for user requests.

All data transmitted by and received by the master controller for each sub-mesh, and their associated network nodes, are contained within a separate command and control (CC) layer of the IP data link. This CC layer is secure, encrypted and assigned the highest priority traffic classification.

For example in one embodiment a control sub mesh GEP controller is configured to assure the security to aircraft node connections to the network by centrally directing aircraft how handover communications data links between nodes. To setup a data link the GEP controller tells the transmit antenna to expect the receiver antenna to come into range for establishing a link. It also tells the receive antenna the reverse. Both antenna then repeat the command to the GEP to ensure it is received. Once confirmed the GEP controller tells the antenna breaking its datalink to prepare to stop transmitting. The GEP controller then provides a synchronised countdown to each antenna separately when to setup/break the datalink. In this way only known and trusted antenna can form datalinks and access the network and ensure the 1-1 relationship on ATG datalinks. This is all done over the command and control layer.

Master controller takes inputs from the system wide nodes above and from a number of other external sources. These other sources include real time flight data, ADS-B information, flight schedules, weather patterns.

Using all of the input data sources the master controller maintains a real time map of the IP data connectivity routing between nodes within the entire system. Regular time interval snapshots of this network map are stored in a database module of the master controller system. Similar snapshot maps of user demand requests per node grouped by traffic classification are stored in another database module of the master controller system.

By reviewing the historical maps for both the network routing and user demand requests, the master controller analyses each sub-mesh and adjacent nodes for behaviour patterns. The master controller combines the information from the behaviour analysis with various other input data sources (e.g. aircraft flight data from the on-board controller, flight paths, weather, etc.) and the technical performance parameters of the entire system to calculate the optimal IP data connectivity routing between existing and new nodes in order to maximise data link quality and meet all user demand requests.

Based on the calculated optimal routing the master controller issues execution commands to each node within the network. The execution commands take the form of a parameter configuration file specific to each node. The parameters direct the node how to control and manage the radio links under its ownership. Examples of such parameters include frequency assignment for the link, spatial coordinates for the far end link, transmit power, minimal link quality, etc.

Figure 3:
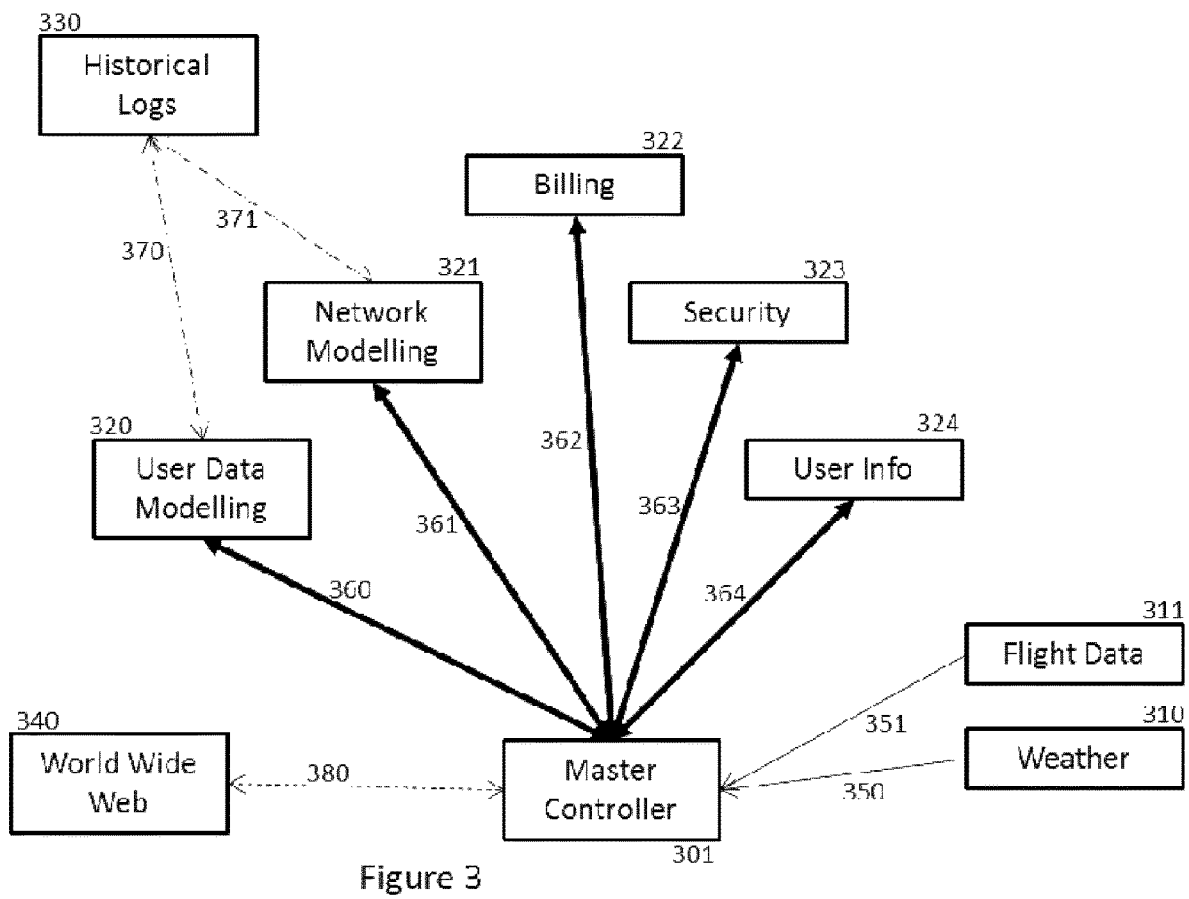
FIG. 3 illustrates a plurality of other data sources (beyond those shown in FIG. 2) and sub system modules used by a master controller, according to another embodiment.

FIG. 3 illustrates a plurality of other data sources (beyond those shown in FIG. 2) and sub system modules used by a master controller (301), according to another embodiment. Various non-public flights data sources (311) such as flight paths, ADS-B and flight schedules are feed to the master controller via secure VPN internet connection (351). Other external public data sources like weather (310) are also feed to the master controller via internet connect (350).

A number of sub system modules (320, 321, 322, 323) are integrated with the master controller. These modules may be housed on separate servers and are all connected together and with the master controller over an internal LAN (360, 361, 362, 363, 364).

Historical logs of the all master controller actions and records are maintained on a separate server (330) and made available to both the network and user data demand modelling modules (320, 321) via the internal LAN (370, 371) to enable behavioural pattern analysis.

It will be appreciated that the command and control of a number of local system equipment and parameters can be delegated to the relevant node controller in order to satisfy the configuration file parameters received from the master controller. These shall include
- Stabilisation of antenna mounting
- Electrical and mechanical steering of the radio link beam
- Actual RF transmit power subject to the configuration file limit When the master controller seeks to add a new node to the network routing the following acquisition process is followed to ensure only valid nodes gain entry to the network.
- While not part of the dynamic network, the new node transmits a radio signal at a wide beam width and low data throughput from its local antennae
- When the new node is nearing the radio link ranges and bearings required to join the network, the master controller transmits a command to the relevant ground station/on-board controller to listen for a new radio link request from the new node as part of the configuration file
- On hearing the radio signal the ground station/on-board controller forms a low bandwidth link isolated from the wider system. The ground station/on-board controller confirms the serial number of the new node and transmits this to the master controller
- The master controller validates the serial number against the expected new node details. If valid the master controller issues a configuration file to the ground station/on-board controller and the new on-board controller.

To ensure that valid commands have been received by the ground station and on board controllers and that the dynamic network remains under active control, the authorization sequence for a command is as follows:
- The master controller transmits a command to the ground station/on-board controller
- The ground station/on-board controller receives and decodes the command
- The ground station/on-board controller repeats back to the master controller the requested command
- The master controller verifies the command requested and if correct sends the approval to execute the command In this way, incorrect or unapproved commands cannot be transmitted without the approval of the flight compliance authority. This provides an additional layer of security against unauthorised usage or hijacking.

The master controller will ensure that all aspects of the system remain secure and trustworthy. All communication links to controllers will need to comply with pre-agreed performance characteristics and security considerations. The radio link between the controllers can be implemented using a variety of technologies. With any communications link, there is the possibility of errors occurring in the link due to naturally occurring noise, accidental interference other users, or by intentional interference. To ensure again against accidental commands being received due to communication errors, the system can be configured to construct commands and authorization codes such that they are sufficiently distinct so that errors have a low probability of accidently triggering an un-intended behaviour. One implementation of this is to ensure that there is a sufficient Hamming separation in the codes.

It will be appreciated that an important aspect of the invention is non-cooperative independent aircraft which are owned by entities other than the telecommunication system operator. In this situation, it is not possible to move the aircraft into preferable locations but the aim is to optimise the network behaviour given their existing locations.

EXAMPLE EMBODIMENT

This embodiment illustrates a network using a combination of ground-to-air and air-to-air radio communication links between aircraft, according to one aspect of the invention. The ground stations will provide a link to the general internet. Unlike other proposed schemes, these aircraft are independent vehicles and the communication links are carried upon them but cannot influence their direction, velocity, or behaviour in any way. The system provides a method for network formation that supports the usage requirement given the constraints of non-cooperative moving platforms.

A database is generated that contains the flight path and recent and current known locations of all aircraft equipped with a compatible ground-to-air and air-to-air communication system. Each aircraft will have a profile that provides information on the levels of functionality it can offer, such as available bandwidth, angles of coverage, available power, and any policies that may have operational impact—such as commercial agreements, legal agreements, access issues, regional spectrum-allocation policies.

Figure 4:
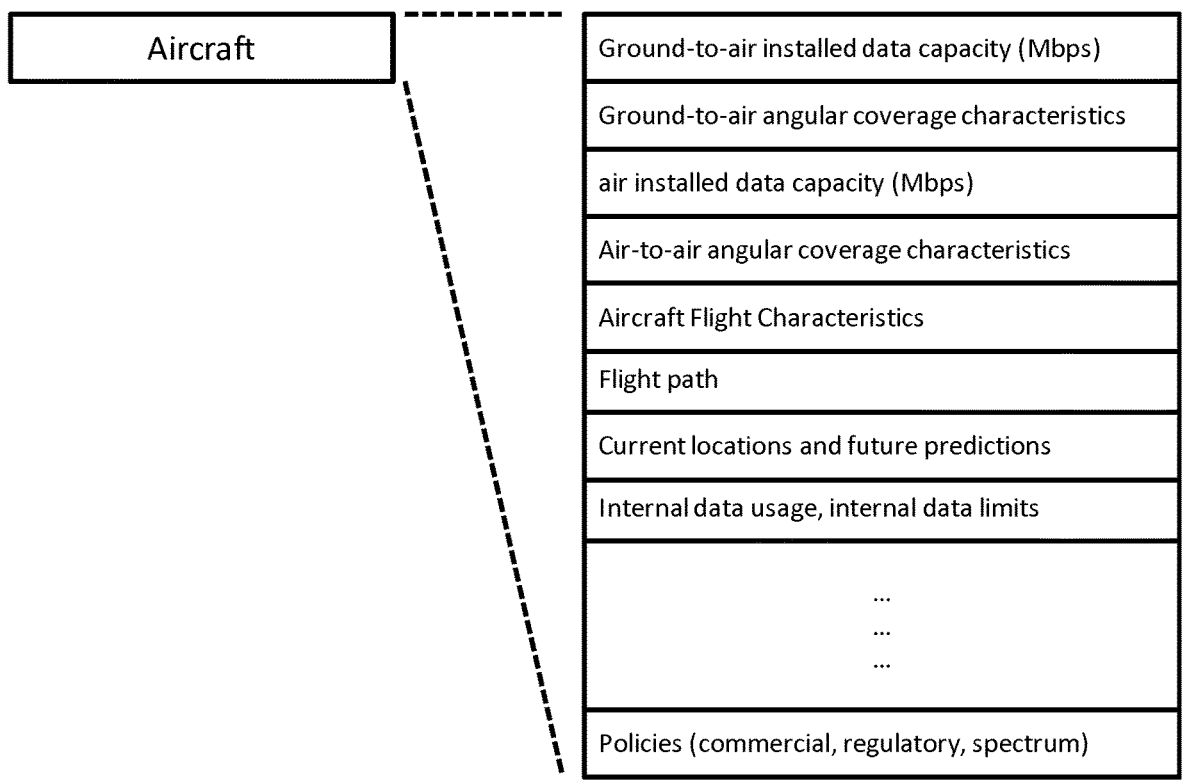
FIG. 4 illustrates how a profile can be generated for each node or aircraft in a sub-mesh region.

FIG. 4 illustrates how a profile can be generated for each node or aircraft in a sub-mesh region, indicated generally by the reference numeral 400. Using the data from the flight plans, aircraft location updates on direction and speed, the database will make a prediction of future locations for each aircraft. This will have a level of uncertainty as weather changes, air-traffic-control mandate changes, or pilot decisions can impact future predictions.

Each aircraft will be profiled to determine the quantity of data throughput it will use. For example a cargo aircraft may be able to participate in the communications network but may have very little or no internal use of the network. Alternatively a large passenger aircraft would have a large personal use requirement but may have commercial agreement constraints on how much it may use. The usage expectations can also be generated from empirical data collated from previous flights for similar aircraft in different regions, times, and progress of flight. From the individual aircraft profile, expected performance and actually current performance, a spatial map will be generated of data usage requirements.

In an exemplary embodiment of the network, the network consists of a number of nodes that are being carried by the aircraft. Each node can have none, one or more connections to the ground and similarly to the other aircraft. Each node in the network must have one connection available to a ground node or to another aircraft node. The availability of a connection is typically constrained by location and angular visibility of other nodes.

The available capacity on a new connection to a node is determined by the physical radio characteristics of the connection (bandwidth, power, distance). On air-to-air connections, the available capacity will also be constrained by the connections the other node has, and the internally sourced data usage that it may already have. Air-to-ground connections may also have performance limitations due to the ground-to-internet connection being shared between multiple aircraft links. The issue of bandwidth sharing will be a greater challenge where there are multiple chained aircraft-to-aircraft links.

Each aircraft will have a network management unit that will liaise with a centralized management unit at the mesh control node or master control node. The purpose of this management function is to ensure that each aircraft optimally picks between the available air-to-air and air-to-ground links such that a data service is provided to each aircraft with maximal performance from a network and individual aircraft perspective. The network management unit will take into account that the each node is in constant movement and the availability of nodes continually changes. It will also utilise the usage and future location map to identify potential regions of congestion and poor coverage. In these scenarios links can be re-arranged to disperse the traffic from congested routes to less congested paths, or to create new links to minimise coverage gaps. A network manager may order the on-board network controller to alter its connections to different air and ground nodes to maintain network. The network manager will also predict future locations of all aircraft and the future availability of connections. In this scenario it may pre-emptively order new connections in preparation for future use.

In response to the ground network controller, the aircraft network controller can initiate a search for new connections—a general search or for a specific node. Upon completion, it will respond to the ground controller on available connections. The situation may arise that a connection may be theoretically available but not discoverable by the aircraft.

The network management unit may set maximum data rates to each aircraft. This may result in throttling of available performance to on-board users. This throttling may be for an overall data-rate but may also be applied to specific traffic types, payment schemes, or other prioritization methods. This is required to ensure that congested data links do not create regions of poor service even though links are available.

Figure 5:
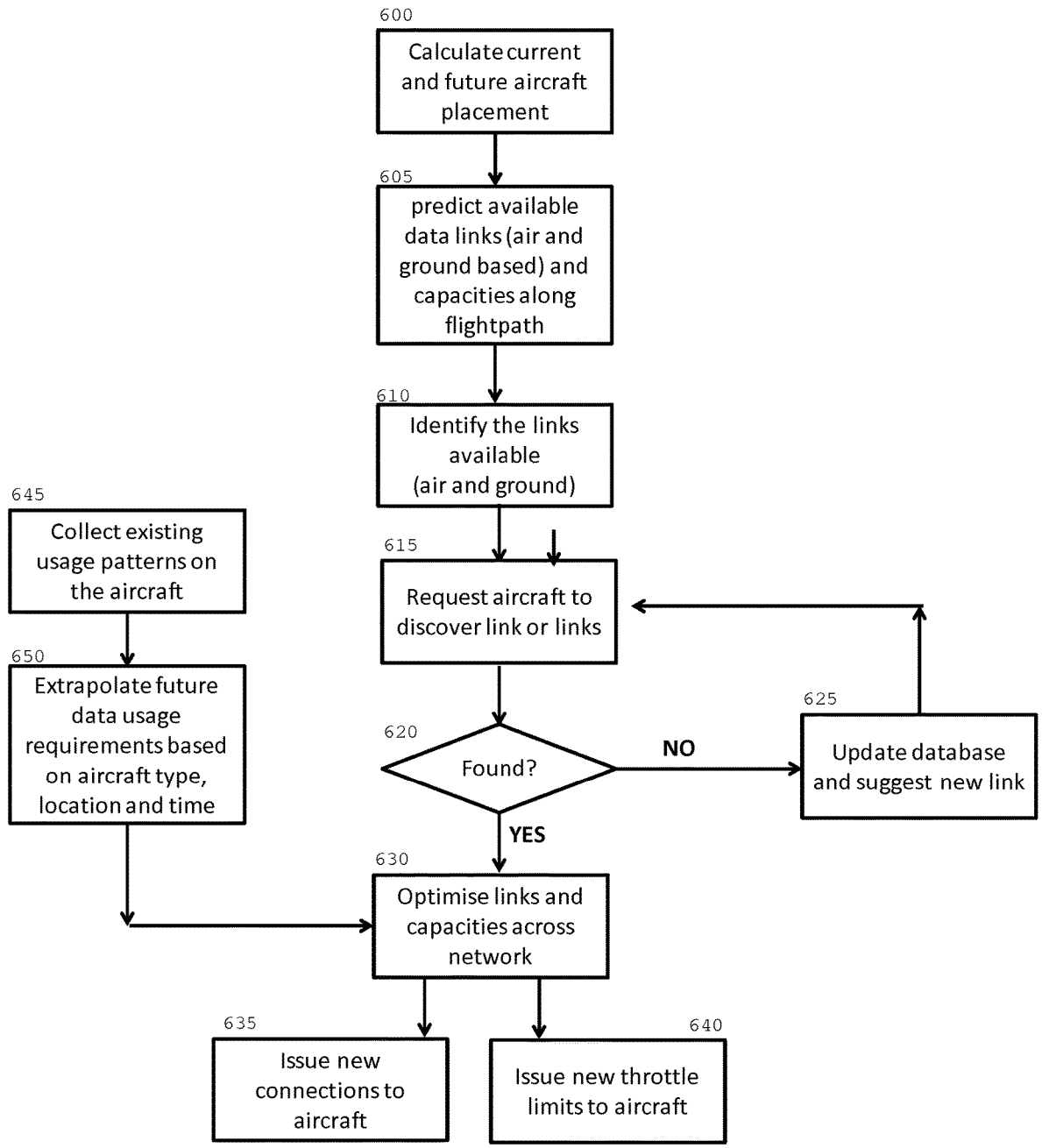
FIG. 5 illustrates a flowchart how a data link can be optimised for a node or aircraft travelling in a sub-mesh region.

FIG. 5 is an example flowchart for the central network manager at the master control node is as follows. In step 600 current and future aircraft placement within the mesh is calculated. In step 605 a prediction of available data links is calculated. This can be done by using historical data usage records for a particular flight and also noting the passenger number size of that aircraft, it is possible to predict particular aircraft that will act a heavy demand sources (e.g. long distance twin aisle). This can be used as an input by the routing algorithm to the assignment of aircraft nodes. For example, that aircraft to a sub-mesh with a lower number of nodes or a sub mesh made up of lighter demand aircraft or a sub-mesh where the sub mesh's air-ground link offers the highest bandwidth. Thereby freeing up total bandwidth supply to meet the specific heavy demand node. Review historical data usage records based on geographic locality can inform the type of end consumer data demands. This can be used to predict key content that we likely to demanded repeatedly by multiple consumers. The routing algorithm can use this to temporarily cache the content on a specific aircraft node and also route this via air-air links to other aircraft node predicted to have the same content demand. Thereby only seeking to transport that content demand once from the air-ground link bandwidth which is a point of bottleneck. In step 610 data links available are identified. In step 615 the controller can request aircraft to discover available links in a particular region. In step 620 if no link is found then the database is updated and a new link suggested based on available data links in step 625. If a link is found then the link is optimised in step 630. In step 635 new connections can be issued to the aircraft depending on data requirement for that aircraft or alternatively throttle limits can be employed in 640 if no additional data links are available in the mesh region. In parallel each aircraft node can calculate at a local level the actual usage in step 645 and calculate projected future usage requirements in step 640. This information from steps 645 and 650 can be fed into step 640 to optimise the scheduling of the data links in real time.

This method can be enhanced where a co-operative aircraft is available. In this scenario the aircraft may change its position or flight path to optimise a network performance by either reducing congestion or by providing connectivity to a region that is underserviced.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A system for managing data connectivity links for a plurality of aircraft in a network wherein at least one aircraft is a non-cooperative aircraft, said system comprising:
a plurality of sub-mesh regions, each sub-mesh having a plurality of nodes, wherein at least one node is representative of an aircraft, and a control sub-mesh node configured to maintain a plurality of data links with the plurality of aircraft in the sub-mesh region based on a generated real-time map of data connections for the sub-mesh region;
a master control node configured to control each control sub-mesh node of each sub-mesh region; and
a module for throttling of aircraft received data throughput in order to maintain optimum data link connectivity to all parts of the network.

2. The system of claim 1, wherein the master control node comprises:
a module that generates the real time map of the data connectivity routing between nodes within the system, wherein the real time map is stored in a database at regular time intervals.

3. The system of claim 2, wherein the module is configured to analyze historical maps for both the network routing and user demand requests.

4. The system of claim 2, wherein the module further analyzes adjacent nodes for behavior patterns.

5. The system of claim 1, wherein an optimal IP data connectivity is assigned a plurality of data traffic classes such that a traffic class can be prioritized when there is limited data connectivity available.

6. The system of claim 1, wherein the master control node is further configured to:
analyze each sub-mesh region for behavior patterns; and
combine behavior pattern information with other input data sources to calculate optimal data links between nodes to maximize data link quality,
wherein the other input data sources comprise at least one of the following: aircraft flight data from an on-board controller, flight paths, or weather.

7. The system of claim 1, wherein the control sub mesh node is configured to assure the security to aircraft node connections to the network by centrally directing aircraft how to handover communications data links between nodes.

8. The system of claim 1, further comprising a network of non-cooperative independent aircraft with some co-operative aircraft, wherein the cooperative aircraft can complement the positions of the other aircraft to strengthen the network.

9. The system of claim 1, wherein the master control node provides a dynamic data connectivity link to at least one of the plurality of nodes via the control node.

10. The system of claim 1, wherein the master control node is configured to provide dynamic assignment of data links between different nodes of said sub-mesh region.

11. The system of claim 1, wherein the control sub-mesh node is connected to an internet exchange fibre optic link, wherein the fibre optic link provides high capacity low latency data routes for user data requests to be transmitted and received to a plurality of nodes in said sub-mesh region.

12. The system of claim 1, wherein each sub mesh is connected to a superior hierarchy node via a series of low latency data connections.

13. The system of claim 1, wherein data transmitted and/or received by the master controller for each sub-mesh are contained within a separate command and control (CC) layer of a data link.

14. The system of claim 13 wherein the command and control layer is sent on a secure channel and assigned a highest priority traffic classification.

15. The system of claim 1, wherein the control sub-mesh node comprises a GEP controller.

16. The system of claim 1, wherein each node in the plurality of nodes of a sub-mesh region comprises a moving aircraft.

17. The system of claim 1, wherein the master control node is further configured to:
analyze each sub-mesh region for behavior patterns; and
combine behavior pattern information with other input data sources to calculate optimal data links between nodes to maximize data link quality.

18. A method for managing data connectivity links for a plurality of aircraft in a network wherein at least one aircraft is a non-cooperative aircraft, said method comprising:
maintaining a plurality of sub-mesh regions, each sub-mesh having a plurality of nodes, wherein at least one node is representative of an aircraft, and a control sub-mesh node configured to maintain a plurality of data links with the plurality of aircraft in the sub-mesh region based on a generated real-time map of data connections for the sub-mesh region;
controlling by a master control node each control sub-mesh node of each sub-mesh region; and
throttling of aircraft received data throughput in order to maintain optimum data link connectivity to all parts of the network.

19. A non-transitory computer-readable storage medium comprising program instructions for:
maintaining a plurality of sub-mesh regions in a network, each sub-mesh having a plurality of nodes, wherein at least one node is representative of an aircraft, and a control sub-mesh node configured to maintain a plurality of data links with a plurality of aircraft in the sub-mesh region based on a generated real-time map of data connections for the sub-mesh region;
controlling by a master control node each control sub-mesh node of each sub-mesh region; and
throttling of aircraft received data throughput in order to maintain optimum data link connectivity to all parts of the network.

* * * * *